US 8,171,015 B2

(12) United States Patent
Jarboe et al.

(10) Patent No.: US 8,171,015 B2
(45) Date of Patent: *May 1, 2012

(54) OPTIMIZING, DISTRIBUTING, AND TRACKING ONLINE CONTENT

(75) Inventors: Greg Jarboe, Acton, MD (US); John Gaffney, Escondido, CA (US); Dana Todd, San Diego, CA (US); Steve Press, Temecula, CA (US); Mike Zemans, San Diego, CA (US); Jamie O'Donnell, San Francisco, CA (US); Gary Saner, San Diego, CA (US); Marlene Matheson, Solana Beach, CA (US)

(73) Assignee: Business Wire, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,447

(22) Filed: Jun. 17, 2011

(65) Prior Publication Data
US 2011/0246446 A1    Oct. 6, 2011

Related U.S. Application Data

(63) Continuation of application No. 12/178,868, filed on Jul. 24, 2008, now Pat. No. 7,970,754.

(60) Provisional application No. 60/951,695, filed on Jul. 24, 2007.

(51) Int. Cl.
*G06F 17/30* (2006.01)
(52) U.S. Cl. ......... 707/713; 707/767; 707/758; 707/721
(58) Field of Classification Search .................. 707/713, 707/706, 707, 708, 709, 721, 758, 767
See application file for complete search history.

(56) References Cited

U.S. PATENT DOCUMENTS

| | | | |
|---|---|---|---|
| 7,472,093 B2* | 12/2008 | Juels | 705/80 |
| 7,559,072 B2* | 7/2009 | Georgis et al. | 725/46 |
| 7,797,722 B2* | 9/2010 | Lin et al. | 725/110 |
| 2004/0015565 A1* | 1/2004 | Bednar et al. | 709/219 |
| 2006/0155751 A1* | 7/2006 | Geshwind et al. | 707/102 |
| 2007/0214133 A1* | 9/2007 | Liberty et al. | 707/5 |
| 2007/0277202 A1* | 11/2007 | Lin et al. | 725/46 |
| 2008/0031280 A1* | 2/2008 | Georgis et al. | 370/486 |
| 2008/0134043 A1* | 6/2008 | Georgis et al. | 715/733 |
| 2008/0167992 A1* | 7/2008 | Kokernak et al. | 705/51 |
| 2008/0215437 A1* | 9/2008 | Levy et al. | 705/14 |
| 2010/0138357 A1* | 6/2010 | Mufti-Bey | 705/36 R |
| 2011/0264768 A1* | 10/2011 | Walker et al. | 709/218 |
| 2012/0004978 A1* | 1/2012 | Kothari et al. | 705/14.42 |

* cited by examiner

*Primary Examiner* — Jean M Corrielus
(74) *Attorney, Agent, or Firm* — Mintz, Levin, Cohn, Ferris, Glovsky and Popeo, P.C.

(57) ABSTRACT

The subject matter described herein relates to systems and techniques for optimizing, distributing, and tracking the use of content online in, for example, Internet search engines and other Internet distribution networks.

19 Claims, 16 Drawing Sheets

| Press Release SEO Tool | | | Manage Releases \| Activity \| Feedback \| Log Out |
|---|---|---|---|

Start — Identify Keywords — Enter Release & Optimize — Add Links — Preview — Export

Getting Started

Each news article you sent out can be "optimized" for News Search Engines – that is, you insert popular, relevant keywords into the release so that it gets more exposure when someone is searching topics in the news. We make it easy for you, with this simple wizard!

There is a one-time fee of $200 for each new release entered into Newsforce. The fee is billed to your Business Wire account when you click "Save and Next" below. There is no charge for repeat edits of the same release.

Tips & Instructions:

→ What is the "Release Name"?
The Release name will help you identify your release in future sessions. You can enter any name you like (such as the headline, the date, or a reference number). Note that all performance reports provided by Newsforce will refer to this press release by the Release Name.

→ What Happens Next?
Newsforce will help you choose popular search words or phrases (Keywords) to optimize your release for news search engines.

To get started, please provide some basic information about your release:

Release Information (?)

| | |
|---|---|
| Release Name: | AD: TECH Presentation by Dana Todd |
| Business Wire Account: | 00000 |
| Coupon Code: | |

Contact Information for This Release (?)

| | |
|---|---|
| Company Name: | SiteLab |
| Website URL: | http://www.sitelab.com |
| Contact Name: | John Gaffney |
| Contact Email: | jgaffney@sitelab.com |
| Contact Phone: | 858-456-4720 |
| Zip Code: | 92037 |

*NOTE: All fields are required. If you don't know your Business Wire Account number, you can contact your Account Executive or local Business Wire Bureau.*

[ Save and Next ]

Copyright © 2006 Newsforce. All Rights Reserved.

FIG. 3

| Press Release SEO Tool | Manage Releases | Activity | Feedback | Log Out |

| Start | Identify Keywords | Enter Release & Optimize | Add Links | Preview | Export |
|---|---|---|---|---|---|
| ⊚ | ● | ○ | ○ | ○ | ○ |

Identifying Keywords
Identifying your release's target keywords is as easy as 1 - 2 - 3!

| (1) Analyze Keywords | (2) Refine Keyword List | (3) Identify 3 Target Keywords |

[ Save & Refresh ]    [ Save & go to (2) > ]

- Please enter Keywords to analyze

Tips & Instructions

→ Phrases are Better than Single Keywords
Single-word phrases are often more popular, but hard to rank well for. Mix one-, two-, and three-word phrases for optimal keyword strategy.

→ Think Like Your Customers
Choose keywords that you think your audiences will use to find news like yours.

→ Can I Skip This Part?
If you already know the keywords you wish to optimize for and want to skip the analysis entirely, just enter your Top Three keywords in the Input Initial Keywords field at right, and click this button:
[ Skip Analysis > ]

→ What About My Brand?
Unless the name of your brand is already well-known, don't use it as a target keyword. Instead, use terms for your product category or type of service.

→ Unlimited Researching
Repeat this process of analyzing initial keywords to increase the list of suggested keywords as much as you desire.

→ Sorting Your Results
Keyword data sorts alphabetically or "Daily Searches" by clicking the corresponding heading.

→ What Happens Next?
Refining the collection of keywords you've analyzed, to a short list of 12 or less.

Enter one or more keywords/phrases that correspond to the topic of your press release, or to your company/industry. Then, click the *Analyze Keywords* button, and Newsforce will quickly analyze your keywords to find out how popular they in terms of daily search queries, plus suggest related keywords you might want to consider.

Input Initial Keywords: ⓘ

(NOTE: Please separate keywords with a comma ",")
```
search engine optimization
search engine marketing
interactive marketing
```

[ Analyze Keywords ]

Research Results: Suggested Keywords & Popularity ⓘ
Select as many terms as you wish, then click Save & go to (2). You may sort the list of keywords by clicking a column header.

| ☐ | Keywords | Daily Searches ▼ |
|---|---|---|
| ✓ | search engine optimization | 83072 |
| ✓ | search engine marketing | 36499 |
| ☐ | search engine optimization services | 22699 |
| ☐ | search engine optimization company | 11977 |
| ☐ | web search engine optimization | 11676 |
| ☐ | dsl search engine optimization | 2706 |
| ☐ | search engine optimization service | 2254 |
| ☐ | search engine optimization specialist | 1273 |
| ☐ | search engine optimization search engine placement | 814 |
| ✓ | interactive marketing | 812 |
| ☐ | search engine marketing company | 733 |
| ☐ | search engine optimization google | 710 |
| ☐ | search engine marketing services | 683 |
| ☐ | search engine marketing firm | 660 |
| ☐ | search engine optimization firm | 652 |

FIG. 4

| Press Release SEO Tool | Manage Releases | Activity | Feedback | Log Out |

Start — Identify Keywords — Enter Release & Optimize — Add Links — Preview — Export

Identifying Keywords
Identifying your release's target keywords is as easy as 1 - 2 - 3!

| (1) Analyze Keywords | (2) Refine Keyword List | (3) Identify 3 Target Keywords |

[ Save & Refresh ]    [ Save & Next > ]

Now the hard part – select up to 3 top keywords! Order of the Top 3 is critical – prioritize them in terms of desirability. (You must select at least one keyword below. Choose up to three total if you want to optimize for them all.) When finished, click Save & Next.

Select Most Important Keyword: *(or type new)*
[ search engine marketing ▾ ]

Select Second Keyword: *(or type new)*
[ search engine optimization ▾ ]

Select Third Important Keyword: *(or type new)*
[ interactive marketing ▾ ]

Tips & Instructions

→ Select Relevant Keywords
Choose wisely! To rank well in search engines, your Top 3 "Target" keywords must appear in specific parts of your release such as Headline and Body. Don't pick words you're not willing to repeat several times in your text.

→ What Happens Next?
After selecting your Top 3 keywords, you will move on to the next step in which you will enter your press release and then be instructed in how to optimize it for these keywords.

[ Save & Refresh ]    [ Save & Next > ]

[ < Return To Start ]

Copyright © 2006 Newsforce. All Rights Reserved.

FIG. 6

Press Release SEO Tool     Manage Releases | Activity | Feedback | Log Out

Start    Identify Keywords    Enter Release & Optimize    Add Links    Preview    Export

Enter Release & Optimize
First, enter your press release in the fields on this page. You can either:

- Upload your entire release to this page! Click Upload Release or

- Manually cut and paste each part of your release into the fields below

THEN, by clicking the *Optimize* button below, this page will guide you in how best to optimize your press release for your Top 3 keywords:

Top 3 Target Keywords
1 search engine marketing
2 search engine optimization
3 interactive marketing
[ Edit... ]

Tips & Instructions

➔ The Headline
Enter a two-deck headline, approximately 120 characters long (the limit displayed by Yahoo News & AOL News). However, the first 60 characters must be able to stand alone because that is all Google News will display.

Include your #1 Target Keyword in the first 7 words of the headline.

➔ The Subhead
Some people use subheads, some don't. While a subhead can contribute to your release's optimization, your headline is more important in news search, so the Subhead field is optional.

➔ The Body
You can use the toolbar to format your body copy (bold, indent, bulletpoints, etc.). Be aware, however, not all distribution outlets will display all formatting.

Please spell-check your release in a word processing program before you paste.

Don't include any part of the release's dateline in the Body field.

➔ The Abstract
Write two sentences (200 - 250 characters) that describe the "gist" of your news, or just use the first paragraph of your release. This will serve as the meta description tag associated with your release, so make sure that it incorporates at least two of your Top 3 keywords.

➔ The Keyword List
This field represents the refined list of keywords you may have compiled in the Identify Keywords step [tab (2)], including the Top 3 Keywords displayed at the top of this page. This will serve as the meta keyword tag associated with your release— while Google ignores it, Yahoo uses this tag, so we do too.

➔ What happens next?

[ Save & Refresh ]     [ Optimize ]

Headline (?)
*Displayed on Google(60 char)* ↓ (?)

(?) *Displayed on Yahoo(120 char)* ↑ Chars: 0

Subhead (Optional) (?)

Dateline (?)
Location:
Date:

Body (?)
B / ⌀ ≡ ≡ 译 译

FIG. 7

Press Release SEO Tool      Manage Releases | Activity | Feedback | Log Out

Start    Identify Keywords    Enter Release & Optimize    Add Links    Preview    Export

Enter Release & Optimize
First, enter your press release in the fields on this page. You can either:

- *Upload your entire release to this page!* Click Upload Release
  or
- *Manually cut and paste each part of your release into the fields below*

THEN, by clicking the *Optimize* button below, this page will guide you in how best to optimize your press release for your Top 3 keywords:

Top 3 Target Keywords
- #1 search engine marketing
- #2 search engine optimization
- #3 interactive marketing

[ Edit... ]

---

Tips & Instructions

→ The Headline
Enter a two-deck headline, approximately 120 characters long (the limit displayed by Yahoo News & AOL News). However, the first 60 characters must be able to stand alone because that is all Google News will display.

Include your #1 Target Keyword in the first 7 words of the headline.

→ The Subhead
Some people use subheads, some don't. While a subhead can contribute to your release's optimization, your headline is more important in news search, so the Subhead field is optional.

→ The Body
You can use the toolbar to format your body copy (bold, indent, bulletpoints, etc.). Be aware, however, not all distribution outlets will display all formatting.

Please spell-check your release in a word processing program before you paste.

Don't include any part of the release's dateline in the Body field.

→ The Abstract
Write two sentences (200 - 250) characters) that describe the "gist" of your news, or just use the first paragraph of your release. This will serve as the meta description tag associated with your release, so make sure that it incorporates at least two of your Top 3 keywords.

→ The Keyword List
This field represents the refined list of keywords you may have compiled in the Identity Keywords step [tab (2)], including the Top 3 Keywords displayed at the top of this page. This will serve as the meta keyword tag associated with your release—while Google ignores it, Yahoo uses this tag, so we do too.

→ What happens next?

---

[ Save & Refresh ]      [ Optimize ]

Headline

*Displayed on Google(60 char)* ↓

> Dana Todd to Address "Search Engine Marketing for Small and Medium Businesses" at AD:TECH Conference

*Displayed on Yahoo(120 char)* ↑ Chars: 100

Subhead (Optional)

> SiteLab Co-Founder will Present Conference Session in New York City Nov. 8, 2005

Dateline

Location: [ ]
Date: [ ]

Body

B / ⊘ ≣ ≡ ≡ | 律 律

WHAT: AD:TECH is the premier event for interactive marketing with conferences and seminars worldwide. AD:TECH provides a forum for the online advertising industry to network, evaluate the latest trends, technologies and services, and learn about interactive, integrated marketing issues that leverage all that technology and the Internet provide. Dana Todd, Executive Vice President and co-founder of SiteLab International, will be one of four panelists discussing "Search Engine marketing for Small and Medium Business." This session outlines tactical tips, pitfalls, and advice on how to make both paid search and search engine optimization techniques works for small organizations and local businesses.

For more information visit http://www.ad-tech.com

WHEN: November 7-9, 2005

WHERE: New York Hilton, New York, NY

WHY: This event will be particularly useful to CEOs, CMOs, Marketing Executives, Brand Managers, Ad Executives, Media Directors, Buyers, Planners, Product managers, Solutions Providers, Creative Directors, and other marketing professionals. Speakers from leading online marketing organizations will discuss the tools and technologies that today's executives need to succeed in the new "Age of Engagement." Some of the issues on the agenda are market trends, datapoints, consumer insight, blocking and

FIG. 9

Press Release SEO Tool — Manage Releases | Activity | Feedback | Log Out

Start — Identify Keywords — Enter Release & Optimize — Add Links — Preview — Export

Preview Your Press Release

The display of your press release below reflects how it will be sent through your distribution channels and likely appear when published online news agencies.

*NOTE: It is possible that some formatting elements, particularly any links contained in the body of your release, may not all be preserved exactly as illustrated below. The various conditions that could impact the retention of your release's text formatting are ultimately controlled by each individual news agency or other publishing entity that elects to post your press release.*

Tips & Instructions

→ Want to Edit Anything?
Just click the button below:
[ Edit... ]

→ What Happens Next?
The optimization of your press release will be complete upon clicking the *Save & Export* button at the bottom of this page.

The resulting page will confirm completion and enable you to download the optimized release.

---

Dana Todd to Address "Search Engine Marketing for Small and Medium Businesses" at AD:TECH Conference SiteLab Co-Founder will Present Conference Session in New York City Nov. 8 2005

WHAT: AD:TECH is the premier event for interactive marketing with conferences and seminars worldwide. AD:TECH provides a forum for the online advertising industry to network, evaluate the latest trends, technologies and services, and learn about interactive, integrated marketing issues that leverage all that technology and the Internet provide. Dana Todd, Executive Vice President and co- founder of SiteLab International, will be one of four panelists discussing "Search Engine marketing for Small and Medium Business." This session outlines tactical tips, pitfalls, and advice on how to make both paid search and search engine optimization techniques works for small organizations and local businesses.

For more information visit http://www.ad-tech.com

WHEN: November 7-9, 2005

WHERE: New York Hilton, New York, NY

WHY: This event will be particularly useful to CEOs, CMOs, Marketing Executives, Brand managers, Ad Executives, Media Directors, Buyers, Planners, Product Managers, Solutions Providers, Creative Directors, and other marketing professionals. Speakers from leading online marketing organizations will discuss the tools and technologies that today's executives need to succeed in the new "Age of Engagement." Some of the issues on the agenda are market trends, datapoints, consumer insight, blocking and tackling, strategic roadmaps, integrated programs case studies, and much more.

About SiteLab

SiteLab International Inc. is a full-service interactive agency with offices in San Diego and New York City, offering integrated marketing and engineering services designed to build brand awareness and online market positioning. Internationally recognized for leadership in search engine marketing and digital marketing campaigns, SiteLab is considered one of the top experts in the search marketing industry. Additionally, SiteLab was ranked a Top 50 interactive agency by Media Magazine and is a Circle member of SEMPO.

[ < Back ]    [ Save & Export ]

Copyright © 2006 Newsforce. All Rights Reserved.

OPTIMIZING, DISTRIBUTING, AND TRACKING ONLINE CONTENT

RELATED APPLICATION

This is a continuation application of patent application Ser. No. 12/178,868 filed Jul. 24, 2008, issuing under U.S. Pat. No. 7,970,754 on Jun. 28, 2011 and claims priority to U.S. Patent Application No. 60/951,695 filed Jul. 24, 2007, the contents of which are hereby fully incorporated by reference.

TECHNICAL FIELD

The subject matter described herein relates to systems and techniques for optimizing, distributing, and tracking the use of content online in, for example, Internet search engines and other Internet distribution networks.

BACKGROUND

Today, Internet marketers routinely apply the discipline of "search engine optimization" (SEO) to web pages in order to achieve maximum exposure to search engine users. SEO techniques for web page optimization can often be reduced to rule-based best practices.

With the rise of "news search" engines, a similar opportunity exists for optimizing news article and press release. Industry data shows that more users now read online news than print media, and major search engines now routinely mix news articles and content with Web search results. In response, a small number of SEO professionals have begun successfully applying SEO techniques to news articles and press releases. However, the majority of news and PR professionals today are non-technical, and are intimidated by the variety of SEO tools and techniques needed to optimize content and track the results.

SUMMARY

The systems and techniques described herein allow non-technical users to optimize content through tools and guidance needed at each step that is integrated within a single interface. The current subject matter also automatically tracks and reports on the performance of optimized news and press releases, emailing the reports directly to end users.

In one aspect, a method can include one or more of: receiving a document containing content for distribution via one or more online media distribution channels, first analyzing a structure of the document, first determining optimal modifications to the structure of the document, second analyzing keyword frequency and keyword positions in the content of the document, the keyword frequency and keyword positions being analyzed relative to historical data obtained from one or more of the online media distribution channels, second determining optimum modifications to the keywords in the content of the document based on the first analysis, displaying recommended structural changes to the document based on the first determination and recommended keyword modifications to the content based on the second determination to a user in a graphical user interface, receiving input from the user adopting one or more of the structural changes or the keyword modifications to the content, and initiating distribution of the document via one or more of the online media distribution channels.

In an interrelated aspect, a method can include one or more of: receiving a document containing content for distribution via one or more online media distribution channels, first analyzing a structure of the document, first determining optimal modifications to the structure of the document, second analyzing keyword frequency and keyword positions in the content of the document, second determining optimum modifications to the keywords in the content of the document, the keyword frequency and keyword positions being determined based on one or more of the following: other documents that previously achieved high search engine rankings for those keywords, historical data weighted by recency, seasonality and other factors, and neural networks which adapt based on the actual performance of documents for which they make recommendations, displaying recommended structural changes to the document based on the first determination and recommended keyword modifications to the content based on the second determination to a user in a graphical user interface, receiving input from the user adopting one or more of the structural changes or the keyword modifications to the content, initiating distribution of the document via one or more of the online media distribution channels, and analyzing and recording the performance of distributed documents for each optimized keyword in terms of search engine ranking, document opens or views, and related conversion events such as follow-on user contact information submission or product sales.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 2-15 are sample screenshots illustrating a graphical user interface for various aspects relating to the optimization, distribution and tracking of content online.

DETAILED DESCRIPTION

The subject matter described herein can be used to optimize, distribute and/or track the use of content in Internet search engines and other Internet distribution networks. Content includes, but is not limited to, press releases, blog entries, news articles, and other user-generated content.

Figure 1:
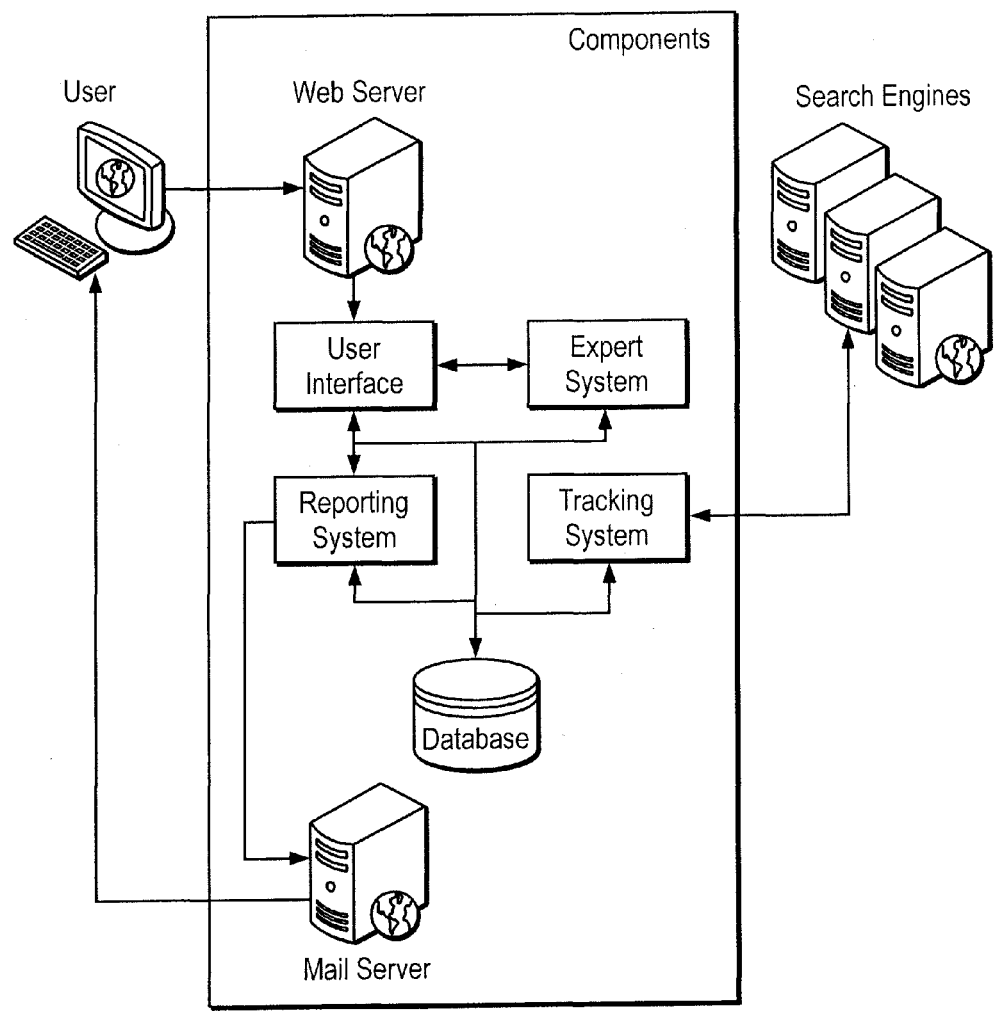
FIG. 1 is a diagram illustrating components of a system for optimizing, distributing, and tracking the use of content online.

The subject matter described herein can be embodied in a system as illustrated in FIG. 1 that includes: (a) a User Interface, including a Wizard that steps users through the content entry and optimization process, (b) an Expert System that analyzes content and makes interactive recommendations regarding the quantity and placement of specific keywords, and the attributes of specific sections of the content (c) an automated Tracking System that finds entered content in search engine results and stores the results, (d) a Reporting System that provides both automated and ad-hoc reports on content performance, and (e) a Database which stores user login, content, and performance measurements.

User Interface: The User Interface provides access to the following capabilities: user login, a content optimization Wizard, performance reporting, account administration, and system administration.

Figure 2:
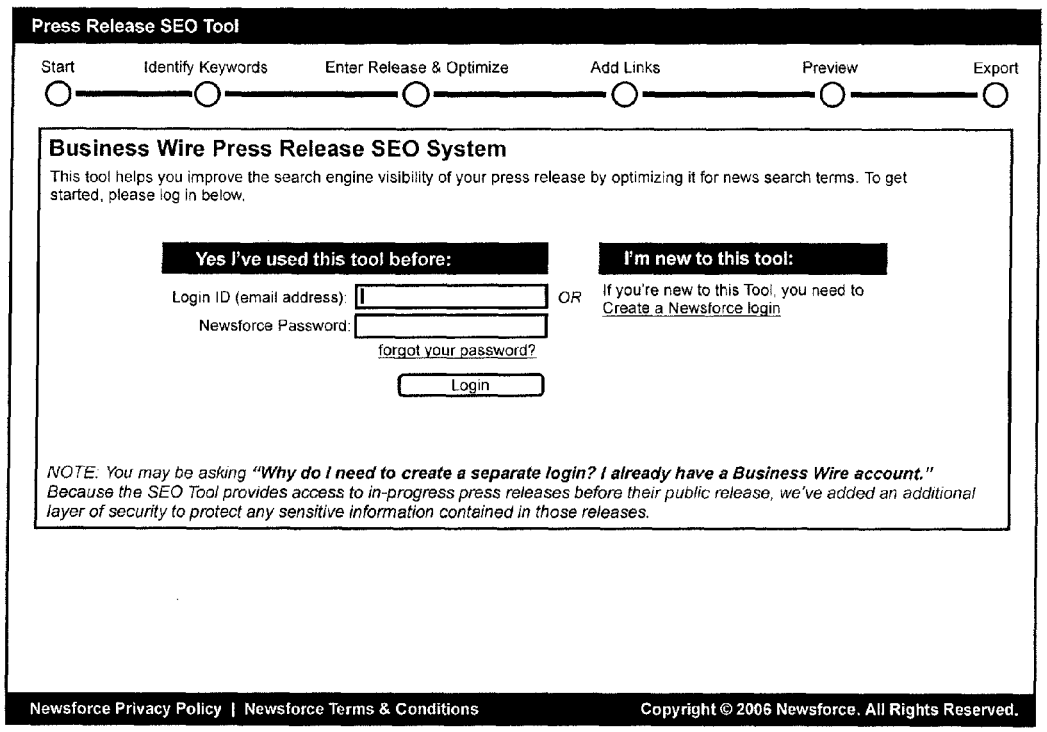

Log In: FIG. 2 illustrates a screenshot of sample login screen in which known users can log in immediately with their ID and password. New users can create an account and log into the system by providing basic contact information and a valid credit card. The system queries a credit card payment gateway to verify card validity. For valid cards, the system creates a new account and stores the information in the database, and then and sends the new user a confirmation email with login credentials. For invalid cards, the user is prompted to try again.

Wizard: A Wizard can be provided that includes a plurality of interrogatories/steps for creating a new content record in the database, performing keyword research, selecting specific keywords for use in optimization, importing press release content, analyzing content and providing iterative change recommendations based on the selected keywords, previewing final content, and exporting for distribution. Extensive, context-sensitive tips and help are provided for every step.

Getting Started: With reference to the screenshot of FIG. 3, the system prompts for the basic information needed to identify the release and communicate its performance to interested parties. The user is prompted to enter a release name, account information, and contact information to be used both in the body of the release and when sending email notifications to the creator.

Analyze Keywords: With reference to the screenshot of FIG. 4, the user is prompted to enter one or more "seed" keywords for the system to research. These seed keywords are any words which the user of the system believes are relevant to the content in question. The system then accesses a database containing usage statistics on the entered keywords and any keywords similar to them.

The system may also access data on the historical correlation of each retrieved keyword with increased search engine visibility for documents that contain that keyword. This performance is stored by the Tracking System as documents are processed, and may also be retrieved from other sources of search engine performance data. Based on such internal correlation data and other sources, more suitable keywords can be identified.

The results are displayed in tabular format and include the keywords, the number of times they were searched for in a recent time period, and other available data which might aid the user in determining the relative value of each keyword.

Additional data may include information on the historical performance of individual keywords, including both long term and seasonal performance, which may be further segmented by the category of the content.

The displayed data can be sorted on any field. The user is prompted to select a subset of the results for later review. An arbitrary number of searches can be performed.

Figure 5:
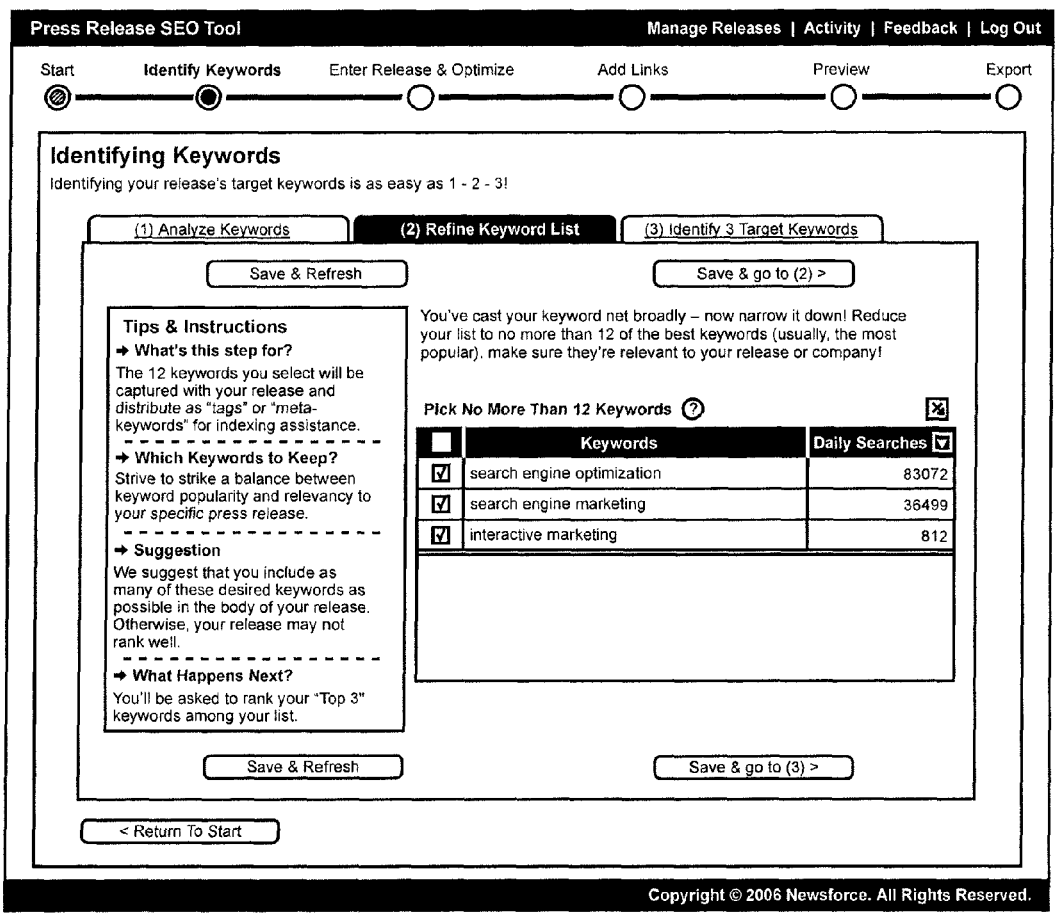

Select Keywords: With reference to the screenshot of FIG. 5, the user is prompted to select and prioritize a small number of keywords or keyword phrases that will be used to optimize the document. The system saves this list of "top keywords" and the previous list of preliminary choices in the database for later reference.

Identify Target Keywords: FIG. 6 is a screenshot illustrating a graphical user interface for selecting the identified target keywords.

Enter Release & Optimize: With reference to the screenshot of FIG. 7, the user can import or simply type or cut and paste content into the displayed document sections.

Figure 8:
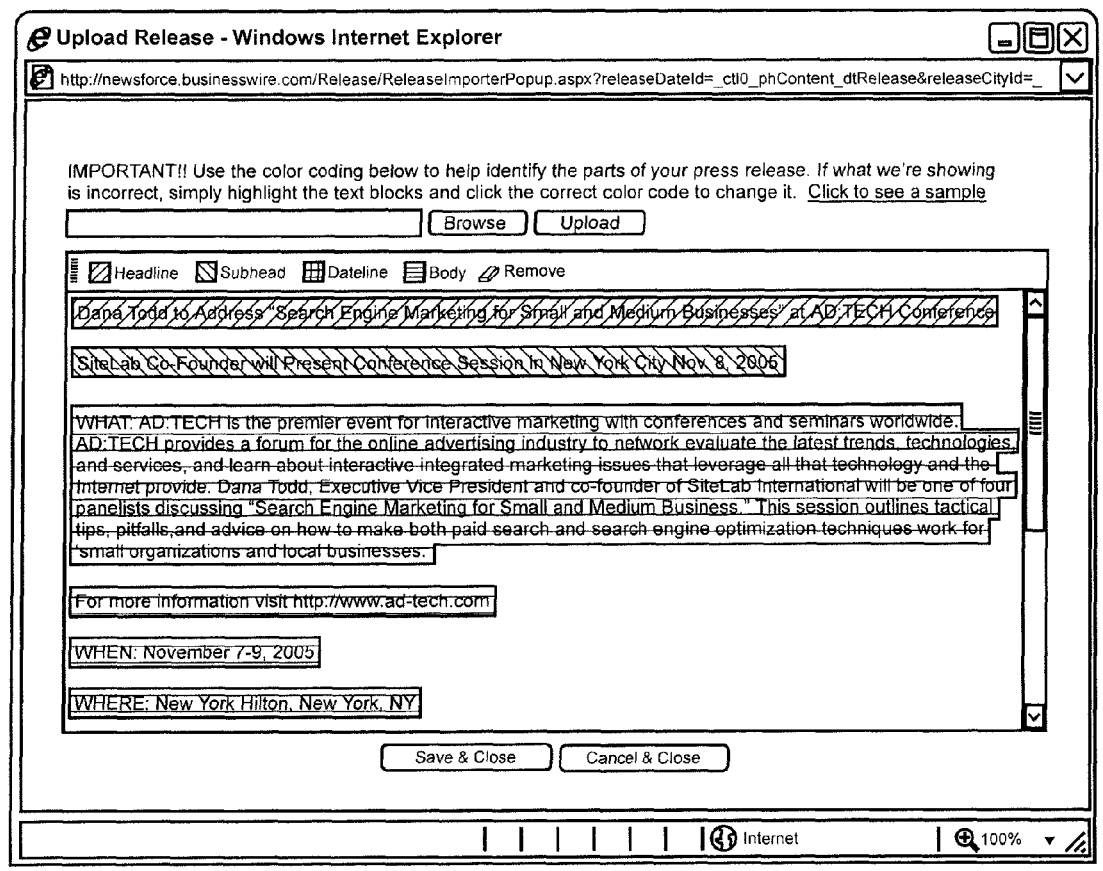

Upload Release: With reference to the screenshot of FIG. 8, the user can import the content of an existing document. The system analyzes the content and breaks it down into proposed sections (e.g. headline, what, where, when, etc.), the boundaries of which the user can change interactively. The system can employ expert system rules to determine the boundaries of the content elements, such as the title, subtitle, dateline, and body. The rules can employ position and pattern-recognition techniques to identify the individual content elements.

The content is then imported and displayed in sections appropriate to the document type.

Analyze Content & Recommend Changes: With reference to the screenshot of FIG. 9, the Expert System analyzes the content as a whole and by section, and displays textual recommendations for edits to each section. After each edit, the user can choose to re-run the analysis or move on to the next step.

Keyword addition recommendations can be based on Expert System rules and algorithms that specify the number of instances of each keyword that should be present in each document section to produce the best search engine visibility for the document overall. The specified number of keywords can be based on a combination of human and Tracking System observation of the historical search engine visibility achieved by documents containing the same keywords.

Other recommendations may include instructions to shorten or lengthen certain document sections, again based on expert observations of historical performance.

Figure 10:
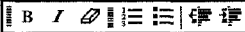

Add Links: With reference to the screenshot of FIG. 10, the system can highlight portions of text in the content which, if contained in a hyperlink, would improve the overall search engine optimization of the document. The highlighted text is selected based on its keyword content. A tool for creating hyperlinks is included.

Figure 11:

Preview: With reference to the screenshot of FIG. 11, the optimized document is displayed as it will appear once exported. The user can go back and make changes or continue to the next step.

Save & Export: With reference to the screenshot of FIG. 12, the user can export the document in a variety of formats, or copy it to the clipboard for email review or other processing.

Figure 13:
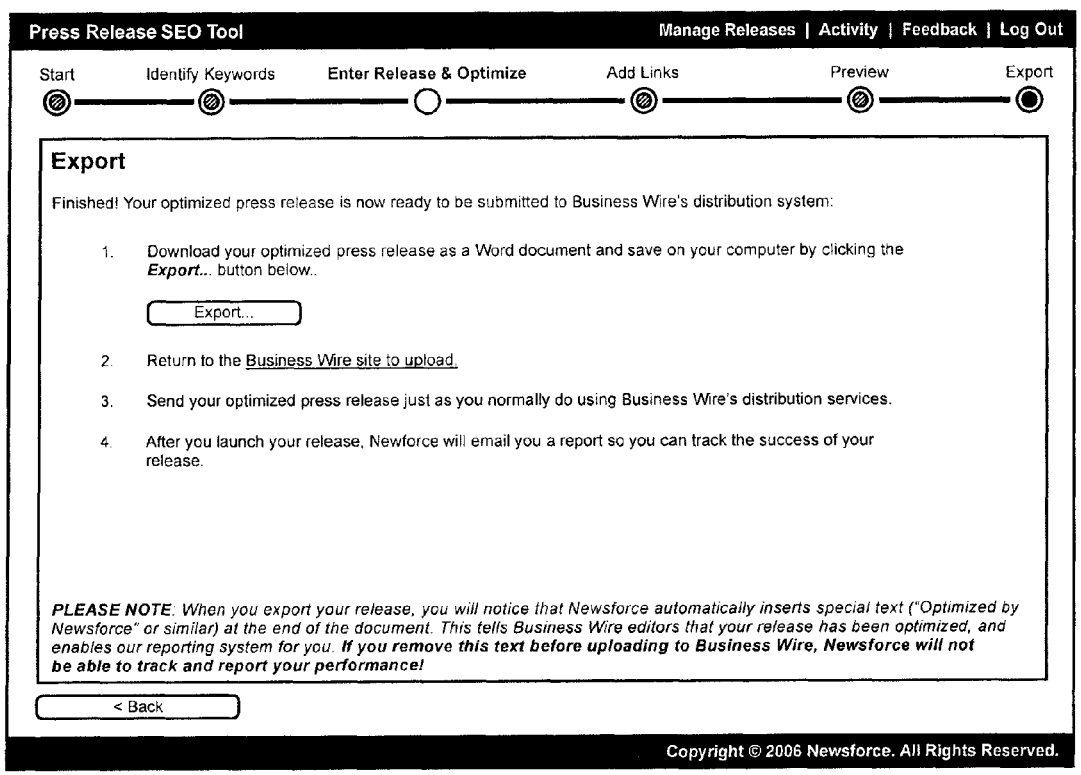

Release Management: With reference to the screenshot of FIG. 13, an interface can be provided to manage releases. For example, the user can select one or more methods of distribution for the press release. Methods include, but are not limited to publishing via:

individual files on a web server, which are then crawled and indexed by search engines;

RSS and Atom feeds on a web server, which are then crawled and indexed by search engines;

specialized index formats, such as Google Sitemaps, which increase the likelihood of inclusion in search results; and wire services and other distribution networks, which then redistribute to subscribing websites and search engines.

Reports

Figure 14:
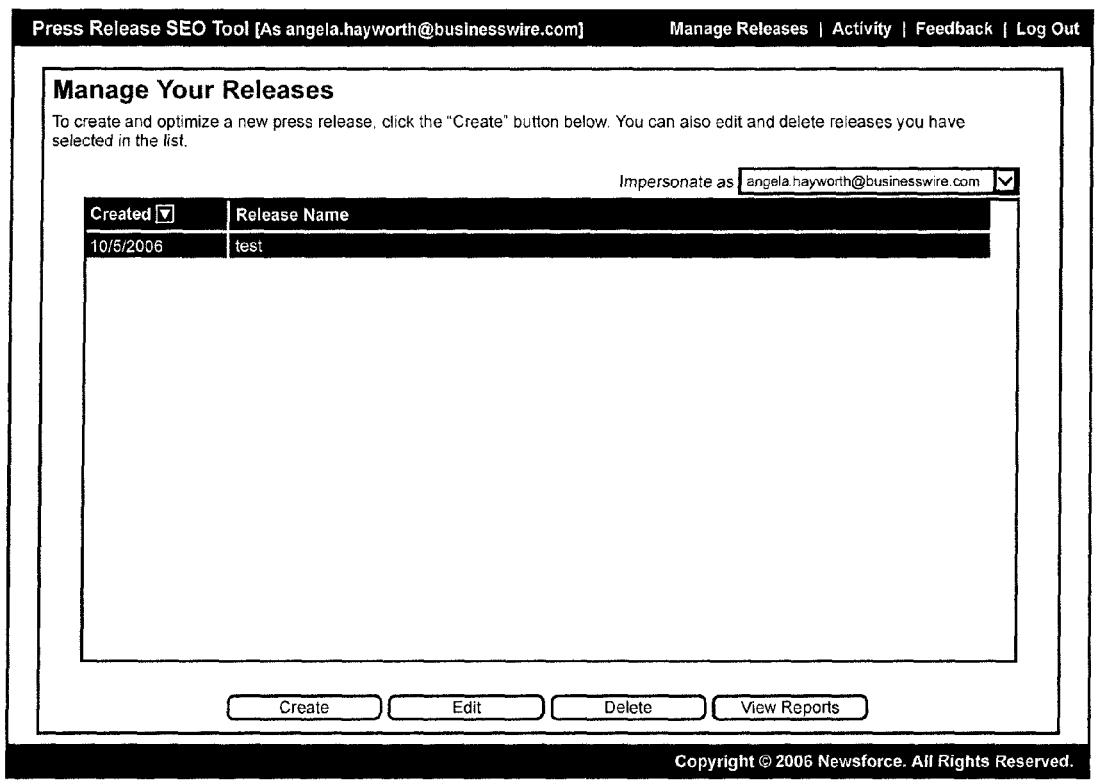

Client Management: With reference to the screenshot of FIG. 14, users such as PR agencies, which manage content optimization on behalf of multiple clients, can enter and manage multiple client accounts and their associated press releases, reports and billing statements.

Figure 15:
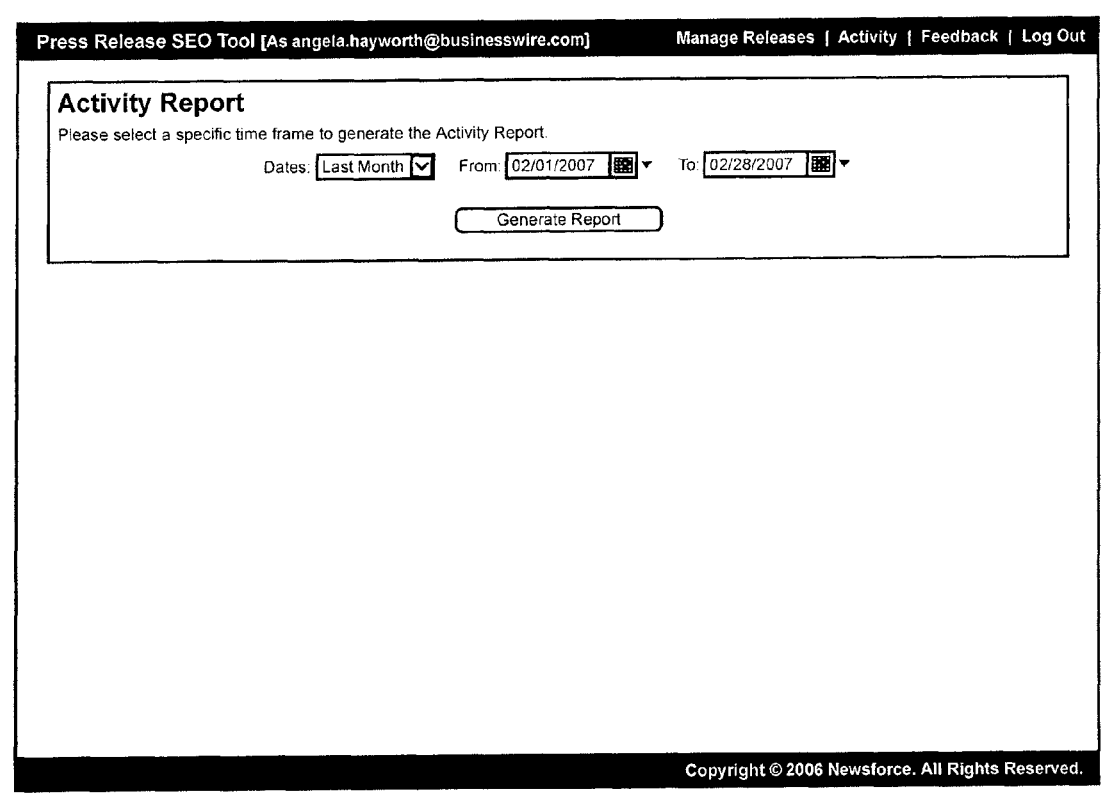

Release Archive: With reference to the screenshot of FIG. 15, a user can access a complete list of previously-optimized content generated by that user or their organization and distributed by the system. Access to archived releases is determined by the permissions granted the user in the User Profile Management screen.

Help: Context sensitive help can be available for the current screen or Wizard step.

Keyword Performance Database: A keyword performance database is maintained to provide data to the Expert System. The data allows the Expert System to determine, for selected keywords, which documents historically ranked high in search results for those keywords. The Expert System can then recommend keyword densities and positions similar those that found in the top ranking documents. It also allows the Expert System to recommend other keywords that were found in these documents and appear to have influenced their search engine ranking, but were not initially selected by the user.

A table of search engine URLs to be accessed for keyword research purposes is maintained by system administrators ("Search Sources").

A table of all keywords and keyword phrases historically selected by users to optimize their documents ("User Keywords") is updated automatically by the system after each keyword selection. A separate table of keywords and keyword phrases deemed important by system administrators ("System Keywords") is also maintained.

At predefined intervals, the User Keywords and System Keywords tables are automatically merged and de-duplicated into a temporary table ("Merged Keywords"). For each keyword, the system then iterates through each of the Search Sources.

For each keyword—search source pair, the system creates a new record in a table of historical searches ("Historical Searches"). The system then retrieves a search result page and stores it in the current Historical Searches record.

The Historical Searches record contains a timestamp, the keyword, the search engine, and fields to store the information retrieved, including the actual HTML search results and other information found in each results page, such as the number of reported searches for the keyword, which could assist with future data mining and analysis.

The system then extracts the document URLs in the search results page and stores them in a table of retrieved document URLs ("Retrieved URLs") and retrieved document data ("Retrieved Data").

Each record in the Retrieved URLs table contains a timestamp, an index to the parent Historical Searches record, the associated keyword, the search source, and the URL of the retrieved document. This arrangement permits quick searches to determine if the same URL has previously been found for the current keyword and search source. If record containing the current URL, keyword and search source combination does not already exist, a new record is created. If the record already exists, the timestamp in the record is updated.

For each Retrieved URL, the system fetches the associated document and stores it in the Retrieved Data table. Stored data can include the displayed title and content snippet from the parent results page, the rank of the document within the results page, the document source (such as a wire service) and dateline (such as city and date), if available, the full content of the retrieved document, estimated views of the title and content snippet, and estimated views of the associated document.

For each retrieved document, the system then performs an analysis of the content, determining the frequency and position of each unique keyword and keyword phrase in the document.

A table of words to ignore ("Stopwords") is first used to remove keywords and keyword phrases that are not of interest. The remaining words are extracted, counted and stored in a table of historical keyword data ("Retrieved Keywords"). The total keyword count is also stored in the parent Retrieved URLs record.

Each record in the Retrieved Keywords table contains a timestamp, an index to the parent Retrieved URLs record, the keyword or phrase extracted, the number of times it was found in the document, the frequency with which the current keyword was found (the current keyword count divided by the total keyword count), the numeric position(s) of the keyword in the list of keywords extracted from the file, the type(s) of HTML tag containing the keyword, and other information which could assist with future keyword research.

After the retrieval process is complete for each keyword in the Merged Keywords table, the system iterates through each of the Retrieved URLs.

For each URL retrieved during the current process, for the current analysis period, the system estimates the number of views of the associated content snippet in the search results, and of clickthroughs to the document itself. View and clickthrough estimates are calculated based on both publicly-available data and data recorded by the system.

Each search results page rank is assigned an estimated percentage of total views and clicks for that page. When multiplied by the number of searches reported by search engines for the associated keyword, an estimate of actual views and clicks can be obtained. The system then stores the estimate in the Retrieved Data record.

Expert System: The Expert System analyzes content to determine the frequency and placement of previously-selected keywords. Frequency Target frequency and placement for the entire document and for the current document element (e.g. "headline") are calculated for each keyword. Frequency is determined by dividing the number of instances of a keyword by the total word count in the examined content. Placement is determined by counting the number of words between the keyword and the first word of the examined content.

The system then uses proprietary, predefined rules to determine determines the optimum target frequency and placement of each keyword, and makes specific recommendations regarding the number of each keyword that should be added or subtracted, and where this should be done in the content.

Rule-Based Keyword Recommendations: In one implementation, target keyword frequency and placement are determined by rules or algorithms which specify target values for all documents, and for specific document sections, based on expert human experience in achieving high search engine rankings for the type of document being processed.

Performance-Based Keyword Recommendations: In another implementation, target values are determined by retrieving the keyword frequency and placement values for other documents that (a) contain the same keywords, and (b) previously achieved high search engine rankings for those keywords. The retrieved values are mathematically combined to produce target values for keyword frequency and placement for the current document.

Weighted Average Approach: In one implementation, the retrieved values are weighted based on recency, seasonality and other factors, and then averaged to generate target values.

For each keyword currently selected by the user ("Current Keywords"), the system consults the Keyword Performance Database to determine if historical performance data is available for that keyword.

If historical data is found for a keyword in the Historical Searches table, the system selects the associated Retrieved Data records. The selection may be limited by user inputs which control the age of the documents retrieved (e.g. "only documents retrieved in the last year"), or by the timeframe (e.g. "only documents retrieved from September to December during the last three years").

The view and clickthrough estimates for retrieved documents are then subtotaled by Retrieved URL, and the records are sorted in descending order by views and limited to a count specified by the system administrator. Each these "Relevant URLs" is then assigned a weight based on the number of views of that URL compared to the total views of all URLs in the selection ("URL Weight").

For each Relevant URL, the system selects the associated keyword density and position data from the Retrieved Keywords table, adds a field to each keyword record containing the parent URL Weight, and appends the keyword records to a temporary "Keyword Analysis" table.

The Current Keywords are located in the table, and aggregated density and position date for each is calculated by creating a weighted average of the individual instances of each Current Keyword in the table based on the URL Weight previously assigned.

The Current Keyword records are then removed from the table, and the table is sorted by keyword density. The top remaining keywords ("Associated Keywords") are selected, and their density and position data averaged as above.

The aggregate density and position for the Current Keywords and Associated Keywords are then presented to the user as targets for optimizing the current document.

Neural Network Approach: In another implementation, a neural network is initially trained using the retrieved values, and is then used to generate the target values instead of the URL Weight method. The Neural Network then adapts based on the actual performance of documents for which it made recommendations, using new keyword performance data provided by the Keyword Performance Database.

Content Structure Recommendations: The system also examines the structure of the content, such as headline length, and compares this to rules which specify the optimum structural attributes for the type of document being analyzed. The system then makes recommendations regarding changes to these attributes.

Figure 16:
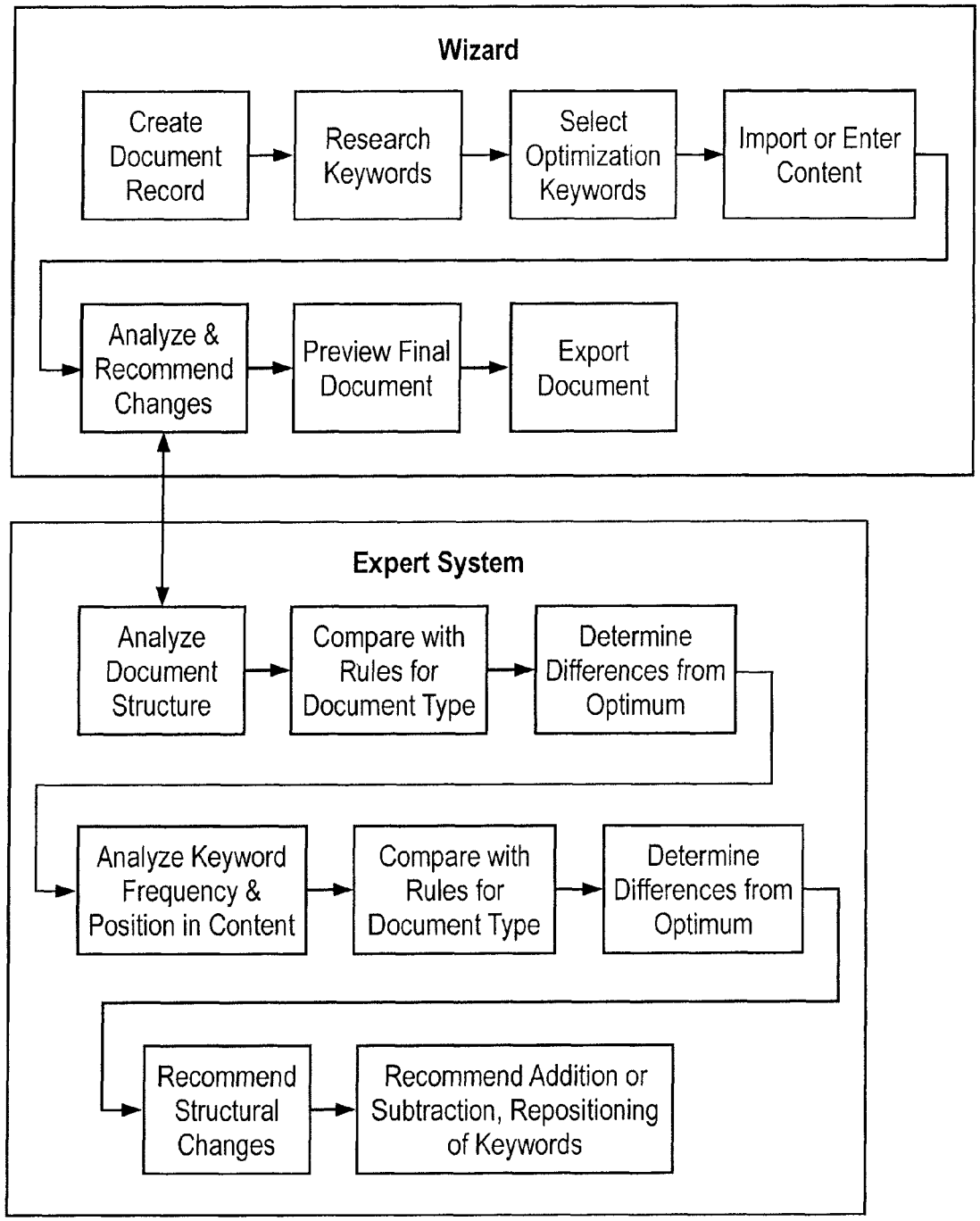
FIG. 16 is a diagram illustrating various Wizard and Expert System processes.

FIG. 16 is a diagram illustrating Wizard and Expert System processes and their interrelationship.

Tracking: The Automated Tracking System queries search engines at specified intervals to determine content performance. For each optimized press release, the tracking system retrieves the keywords used to optimize the release, and queries search engines using each keyword. If the related content is found in the search engine results, the tracking system stores the keyword, the search engine, the position of the content in the listings, the total number of documents found, and other statistical information for further analysis and reporting. The actual results page is also stored for later reference.

The Automated Tracking System also records content "opens" and downstream conversion events that follow a content open. Opens and conversion events are generated by tags included in the content at the time of distribution, and also in the specific web pages for which the content author desires to track conversion events.

Categorization: The system automatically categorizes and tags content before distribution, using tags appropriate to the selected distribution methods. Such tagging makes the content easier to find in search engines and improves the accuracy with which it is further categorized by various distribution networks.

Reporting: The Reporting System generates both automated and ad-hoc performance reports at specified intervals based on the data stored by the tracking system.

Automated reports are emailed to specified users automatically. Ad hoc reports are generated interactively by changing report parameters within the corresponding report screen.

Reports can display data on the performance of a single release, or on any group of releases during a specified time period.

Database: The Database stores user account information, content and their associated optimization attributes content performance information, historical reports and system configuration information.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Historically, multiple tools and techniques have been required to complete each step of the SEO process. Important activities like keyword research, keyword density analysis, content editing, content publishing, and performance analysis and reporting, each require a different tool. The effort required to understand and select these SEO tools and techniques has always been intimidating to non-technical users. This has proven to be particularly true for news and public relations professionals, who have been slow to respond to the opportunity to optimize news article and press release content. The subject matter described herein makes it easy for non-technical users to SEO content by integrating all necessary capabilities within a single product, and walking inexperienced users through each step of the SEO process with complete instructions, tips and context sensitive help.

Although a few variations have been described in detail above, other modifications are possible. For example, the logic flow depicted in the accompanying figures and described herein do not require the particular order shown, or sequential order, to achieve desirable results. Other implementations may be within the scope of the following claims.

What is claimed is:

1. A computer-implemented method comprising:
receiving a document containing content for distribution via one or more online media distribution channels;
analyzing a structure of the document by determining optimal modifications to the structure of the document, analyzing keyword frequency and keyword positions in the content of the document, the keyword frequency and keyword positions being analyzed relative to historical data obtained from one or more of the online media distribution channels, and determining optimum modifications to the keywords in the content of the document based on the document;
displaying recommended structural changes to the document based on the document modification and/or recommended keyword modifications to the content in the document to a user in a graphical user interface; and
receiving input from the user via the graphical user interface adopting one or more of the structural changes or the keyword modifications to the content.

2. A method as in claim 1, further comprising: modifying the document to include the adopted one or more of the structural changes or the keyword modifications to the content, and distributing the document via one or more of the online media distribution channels.

3. A method as in claim 1, wherein at least one of the receiving a document, analyzing a structure of the document, analyzing a structure of the document, displaying recommended structural changes, and receiving input from the user are implemented by one or more data processors.

4. A method as in claim 1, further comprising: analyzing and recording the performance of distributed documents for each optimized keyword.

5. A method as in claim 4, wherein the performance is based on search engine ranking.

6. A method as in claim 4, wherein the performance is based on document opens or views.

7. A method as in claim 4, wherein the performance is based on related conversion events.

8. A method as in claim 4, wherein the performance is based on product sales.

9. A method as in claim 1, wherein the method is implemented by two or more computing systems coupled by a communications network.

10. A method as in claim 1, wherein the document is a press release.

11. An article of manufacture comprising:
computer executable instructions stored on non-transitory computer readable media, which, when executed by a computer, causes the computer to perform operations comprising:
receiving a document containing content for distribution via one or more online media distribution channels;
analyzing a structure of the document;
determining optimal modifications to the structure of the document;
analyzing keyword frequency and keyword positions in the content of the document, the keyword frequency and keyword positions being analyzed relative to historical data obtained from one or more of the online media distribution channels;
determining optimum modifications to the keywords in the content of the document based on the document;
displaying recommended structural changes to the document based on the document modification and recommended keyword modifications to the content in the document to a user in a graphical user interface;
receiving input from the user adopting one or more of the structural changes or the keyword modifications to the content; and
initiating distribution of the document via one or more of the online media distribution channels.

12. An article as in claim 11, wherein the operations further comprise: analyzing and recording the performance of distributed documents for each optimized keyword.

13. An article as in claim 12, wherein the performance is based on search engine ranking.

14. An article as in claim 12, wherein the performance is based on document opens or views.

15. An article as in claim 12, wherein the performance is based on related conversion events.

16. An article as in claim 12, wherein the performance is based on product sales.

17. An article as in claim 12, wherein the document is a press release.

18. A method for implementation by one or more data processors comprising:
receiving, by at least one data processor, a press release document containing content for distribution via one or more online media distribution channels;
modifying, by at least one data processor, the press release document based on historical data obtained from at least one of the online media distribution channels characterizing keyword frequency and keyword positions in the content of the press release document; and
initiating, by at least one data processor, distribution of the document via one or more of the online media distribution channels;
wherein the modifying comprises: analyzing, by at least one data processor, a structure of the document by determining optimal modifications to the structure of the press release document, analog, by at least one data processor, keyword frequency and keyword positions in the content of the press release document, the keyword frequency and keyword positions being analyzed relative to historical data obtained from one or more of the online media distribution channels, and determining, by at least one data processor, optimum modifications to the keywords in the content of the press release document based on the press release document.

19. A method as in claim 18, wherein the modifying further comprises: displaying, by at least one data processor, recommended structural changes to the press release document based on the document modification and/or recommended keyword modifications to the content in the document to a user in a graphical user interface, and receiving, by at least one data processor, input from the user adopting one or more of the structural changes or the keyword modifications to the content.

* * * * *